United States Patent
Buckley et al.

(10) Patent No.: US 8,028,501 B2
(45) Date of Patent: *Oct. 4, 2011

(54) CUSTOM PACKAGING SOLUTION FOR ARBITRARY OBJECTS

(75) Inventors: Robert Roy Buckley, Rochester, NY (US); John Oliver Walker, Rochester, NY (US); Barry Glynn Gombert, Rochester, NY (US); Philip Crane Rose, Sodus, NY (US); Jennifer Colleen Perotti, Pittsford, NY (US)

(73) Assignee: Xerox Corporation, Norwalk, CT (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/851,360

(22) Filed: Aug. 5, 2010

(65) Prior Publication Data

US 2010/0293896 A1 Nov. 25, 2010

Related U.S. Application Data

(63) Continuation of application No. 12/142,200, filed on Jun. 19, 2008, now Pat. No. 7,788,883.

(51) Int. Cl.
| | |
|---|---|
| B65B 43/08 | (2006.01) |
| G06F 19/00 | (2011.01) |
| G06F 17/00 | (2006.01) |
| G06Q 30/00 | (2006.01) |
| B31B 1/88 | (2006.01) |
| G06K 9/00 | (2006.01) |

(52) U.S. Cl. ............ 53/456; 700/97; 700/233; 705/330; 493/320; 382/154

(58) Field of Classification Search .................... 53/456; 705/330; 493/320; 700/97, 233; 382/154
See application file for complete search history.

(56) References Cited

U.S. PATENT DOCUMENTS

| | | | | |
|---|---|---|---|---|
| 5,528,517 | A | * | 6/1996 | Loken ............................ 702/156 |
| 6,005,959 | A | * | 12/1999 | Mohan et al. .................. 382/110 |
| 6,689,035 | B1 | | 2/2004 | Gerber |
| 6,895,549 | B1 | | 5/2005 | Albright et al. |
| 6,939,063 | B2 | | 9/2005 | Bussell |
| 7,197,465 | B1 | | 3/2007 | Hu et al. |
| 7,327,362 | B2 | | 2/2008 | Grau |
| 7,647,752 | B2 | | 1/2010 | Magnell |
| 2002/0085001 | A1 | * | 7/2002 | Taylor ............................ 345/440 |

(Continued)

FOREIGN PATENT DOCUMENTS

WO 2005000681 A2 1/2005

(Continued)

OTHER PUBLICATIONS

Liang Lu et al., "Folding Cartoons with Fixtures: A Motion Planning Approach", IEEE Transactions on Robotics and Automation, vol. 16, No. 4, Aug. 2000.

*Primary Examiner* — Fadey Jabr
(74) *Attorney, Agent, or Firm* — Pepper Hamilton, LLP

(57) ABSTRACT

A method of producing a packaged uses an electronic user interface to receive a first image of an object to be packaged, along with information relating to one or more properties of the object. A three dimensional size for the object is determined, and a package is automatically selected. Based on the object properties, a packing material type is automatically determined. Based upon the size and the selected package, a packing material amount is determined.

20 Claims, 3 Drawing Sheets

U.S. PATENT DOCUMENTS

| | | |
|---|---|---|
| 2002/0118874 A1 | 8/2002 | Chung et al. |
| 2003/0035138 A1 | 2/2003 | Schilling |
| 2003/0083763 A1 | 5/2003 | Kiyohara et al. |
| 2003/0091227 A1 | 5/2003 | Chang et al. |
| 2003/0164875 A1 | 9/2003 | Myers |
| 2003/0200111 A1 | 10/2003 | Damji |
| 2004/0073407 A1 | 4/2004 | Nguyen et al. |
| 2004/0120603 A1* | 6/2004 | Gupta .................... 382/286 |
| 2005/0050052 A1 | 3/2005 | Zimmerman et al. |
| 2005/0249400 A1* | 11/2005 | Fukumoto .................... 382/154 |
| 2006/0155561 A1 | 7/2006 | Harper |
| 2007/0112460 A1 | 5/2007 | Kiselik |

FOREIGN PATENT DOCUMENTS

| | | |
|---|---|---|
| WO | 2005054983 A2 | 6/2005 |
| WO | 2005122079 A2 | 12/2005 |
| WO | 2007021920 A2 | 2/2007 |

* cited by examiner

CUSTOM PACKAGING SOLUTION FOR ARBITRARY OBJECTS

RELATED APPLICATIONS

This application claims priority to and is a continuation of co-pending U.S. patent application Ser. No. 12/142,200, filed Jun. 19, 2008.

BACKGROUND

Packaging solutions for objects have driven manufacturing industries. Often mass manufactured items are created with associated customized packaging designs for mass distribution purposes.

A need exists, however, for customized packaging solutions on a smaller scale for individual users. Prior art has allowed users to select their own packaging and incorporate personalization elements on the chosen customized packaging. Two such pieces of prior art are U.S. Patent Application Pub. No. 2007/0112460 (application Ser. No. 11/590,365) and U.S. Patent Application Pub. No. 2003/0035138 (application Ser. No. 10/217,275).

U.S. Patent Application Pub. No. 2007/0112460 discloses a method and system for facilitating individualized packaging allows a user to either select a packing template for a predefined group or provides the user with a single template. The packaging template determination, however, occurs prior to any user input of packaging information. Further, the one-of-a-kind packaging of this application is linked to the printing of a customized image and information onto the previously user-selected packaging.

U.S. Patent Application Pub. No. 2003/0035138 discloses an internet-based custom package-printing process which enables users to control package selection, design, shipping and payment decisions through Internet means. The user once again is the one to select the package design for the desired object. Users need to input the information mechanically to determine the appropriate packaging from the options they will then be provided.

A problem exists which the prior art has not addressed. Objects are often separated from the packaging and packing material they arrive in after a period of use. The object may then later need a package and packing material for storage or shipping purposes. The current solutions simply allow the users to select the closest available box packaging size and packing material as needed.

SUMMARY

Before the present systems, devices and methods are described, it is to be understood that this disclosure is not limited to the particular systems, devices and methods described, as these may vary. It is also to be understood that the terminology used in the description is for the purpose of describing the particular versions or embodiments only, and is not intended to limit the scope.

It must also be noted that as used herein and in the appended claims, the singular forms "a," "an," and "the" include plural references unless the context clearly dictates otherwise. Unless defined otherwise, all technical and scientific terms used herein have the same meanings as commonly understood by one of ordinary skill in the art. Although any methods, materials, and devices similar or equivalent to those described herein can be used in the practice or testing of embodiments, the preferred methods, materials, and devices are now described. All publications mentioned herein are incorporated by reference. Nothing herein is to be construed as an admission that the embodiments described herein are not entitled to antedate such disclosure by virtue of prior invention. As used herein, the term "comprising" means "including, but not limited to."

In an embodiment, a method of producing custom packaging may include receiving through an electronic user interface a first image of an object to be packaged and information relating to the material properties of the object, determining the three dimensional size of the object, automatically selecting at least one package for the object, automatically determining a packing material type based on the material properties information, and automatically determining a packing material amount based on the three dimensional size of the object and the selected package.

Optionally, the method may include receiving shipping information via the user interface and printing the shipping information on a selected package. Additionally, the first image may include a background with a plurality of reference points that provide a known dimension. The method may then include the determining of a three dimensional size through the comparison, via image processing, of the object to the background. Additionally, the method may include automatically selecting a packaging by accessing an available inventory of package sizes, comparing the determined three dimensional size of the object to the available inventory, and selecting from that inventory a package larger than yet having the closest size to the size of the object. The method may further include a plurality of reference points within a grid of preselected coordinates. Or, the method may include a plurality of reference points comprising dimensions on a ruler.

The method may also include printing the first image on the selected package.

Optionally, the method may include one or more material properties indicating the fragility of the object, and automatically determining the packing material type based on those material properties. Additionally, the one or more material properties may inform of the weight of the object and, hence, the method may include automatically selected a package based on its weight and determined size.

As another option, the method may further include receiving a second image of the object through the user interface. The first and second images may show the object from different perspective views. The first image may include a first background which has a plurality of reference points providing a known dimension. The second image may include a second background which has a plurality of reference points providing a known dimension. The method may then include determining a three dimensional size by using image processing to compare the object to the first and second backgrounds.

Optionally, the method may further include displaying a design of the selected package for user approval, receiving a user acceptance of the design, providing the packing material of the determined type and amount to the user, and providing the selected package to the user. Or, the method may include displaying a design of the selected package for user approval, receiving a user modification to the design through the user interface, selected a modified package based on the user modification, and automatically determining, based on a modified package size, whether to modify the determined packing material type and amount, and providing the modified package to the user. Or, the method may include displaying a plurality of candidate package designs for user approval, receiving a user-selected design from the candidate package designs, providing a package having the user-selected design, and providing the packing material having the determined size and amount.

In an embodiment, a method of producing custom packaging may include displaying a plurality of candidate package designs for user approval on an electronic user interface, receiving through the user interface a user-selected design, shipping information, a first image of an object to be packaged, and information relating to the material properties of the object, determining the three dimension size of the object, automatically selecting at least one package for the object where the package incorporates both the user-selected design and the shipping information, automatically determining a packing material type based on the material properties information, and automatically determining a packing material amount based on the three dimensional size of the object and the selected package.

BRIEF DESCRIPTION OF THE DRAWINGS

Aspects, features, benefits and advantages of the present application will be apparent with regard to the following description and accompanying drawings, of which.

DETAILED DESCRIPTION

Figure 1:
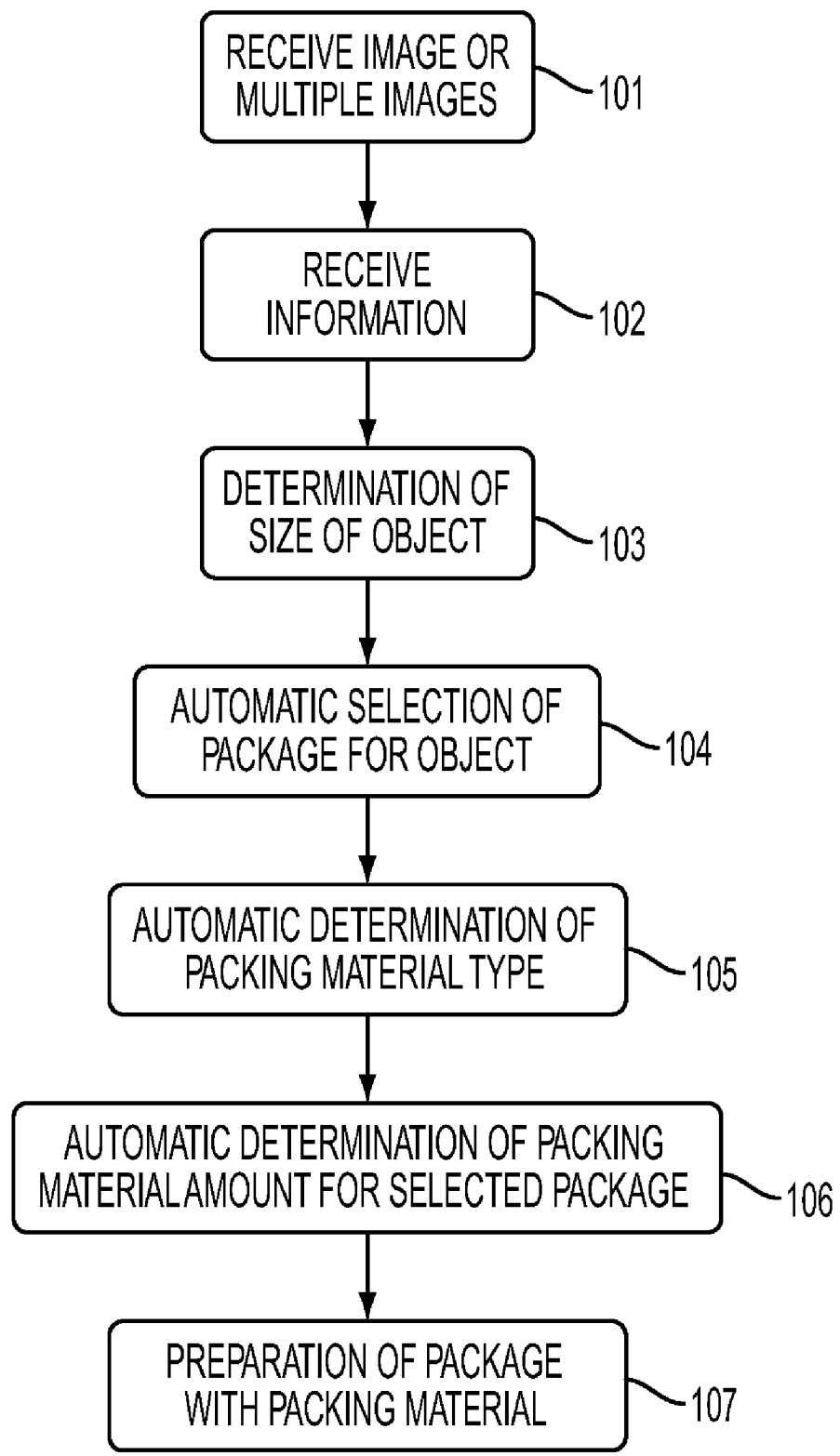
FIG. 1 depicts a flow diagram of an exemplary method of creating a customized packaging system for arbitrary objects.
Figure 3:
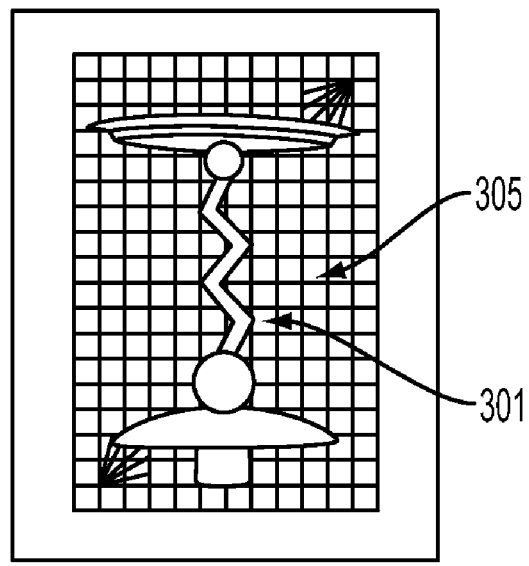
FIG. 3 depicts an example of first received image of an object to be packaged wherein the first background has a plurality reference points that provide a known dimension.

This application pertains to methods for a customized packaging system for arbitrary objects. According to an embodiment, FIG. 1 depicts a flow diagram of an exemplary method of creating a customized packaging system for arbitrary objects wherein various printing options may be available as well. As shown in FIG. 1, an image or images 101 and information 102 may be received from a user via an electronic user interface. As shown in FIG. 3, a first image of the object 301 for packaging may be received wherein the first image has a background 305 with a plurality reference points that provide a known dimension. Optionally, the reference points may be on a grid or other predetermined background, optionally, which may be made available to the user by the system, such as via download from a website. From this first image, a determination of the three dimensional size of the object 103 may be made. After this determination 103 is made, a package for the object may be automatically selected 104. Other material properties for the object may be information received 102 as well via the electronic user interface. From these material properties, a type of packing material for the object may be automatically determined 105. From the automatic selection 104 of the package and the automatic determination 105 of the packing material type, the packing material amount for the selected package may be automatically determined 106.

The package with the determined amount of packing material may be then prepared 107 and may contain certain printed items.

In an embodiment, shipping information may be received 102 through the electronic user interface. The shipping information may be printed onto the package when the package is prepared 107 with the packing material.

In another embodiment, the first image may be received 101 and may be printed onto the package when the package is prepared 107 with the packing material.

In another embodiment, the material properties may be received 102 as information and may include a description of the object as fragile or non-fragile. From the description, an automatic determination 105 of the packing material type may be made. Weight of the object may be received 102 as other information. This weight may then affect the automatic selection 104 of the package for the object in order to accommodate the weight of the object.

In another embodiment, a second image of the object may be received 101 via the electronic user interface. This second image may be taken from a different perspective view from the first image as presented in FIG. 4. This second image also has a background with a plurality reference points that provide a known dimension. The first image and second images are then compared and the three-dimensional size of the object is determined 103.

Figure 2:
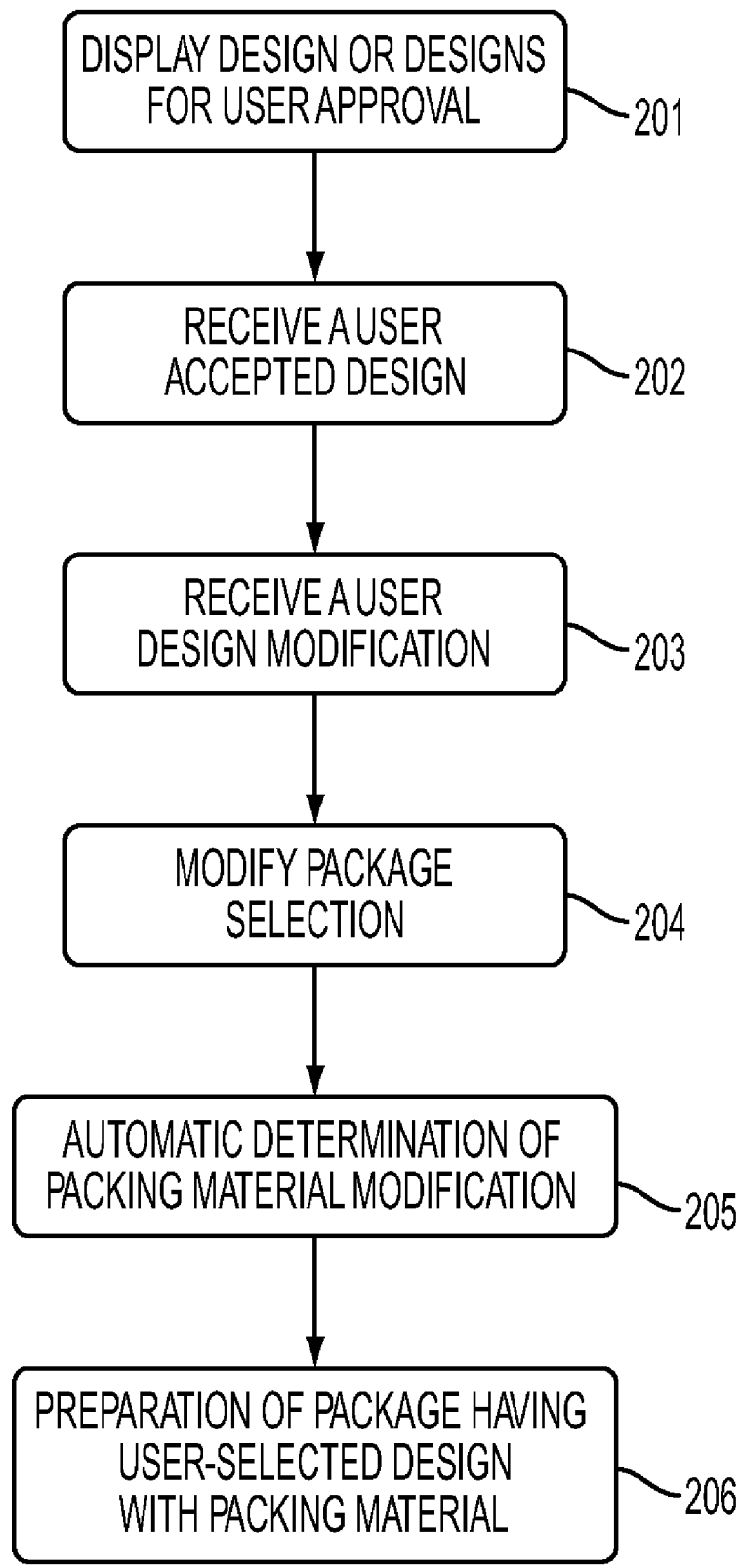
FIG. 2 depicts the flow diagram of the method of FIG. 1 with the additional features of display of a design or a plurality of designs for user approval on the electronic user interface, which in turn may be selected by the user or selected with an additional modification. The selection may then effect the automatic determination of the package and packing material. Providing the package and packing material are included in this embodiment as well.

According to another embodiment, FIG. 2 depicts the flow diagram of the method of FIG. 1 with the additional features of display 201 of a design or a plurality of designs for user approval on the electronic user interface. In turn, via the interface, user acceptance is received 202 or an acceptance with an additional modification is received 203. If the user selects from the design candidates provided, and the user selection is received 202, a process such as provided in FIG. 1 may be followed. At the end, the determined size of the package and amount of the packing material may then be provided wherein the package has the user-selected design 206.

If a user design modification is received 203 via the interface, the package selection may require modification 204. At the end of the package selection process, the determined size and amount of the packing material may then be provided in order for the package to be prepared 107 with the packing material. The user modified selection may then effect and modify the automatic determination 204 of the package and the automatic determination 205 of the packing material. Finally, the package having the user-selected design with packing material is provided and prepared 206.

In another embodiment, certain printing images may be included. Shipping information is received 102 about the object and a first image of the object is received 101 via an electronic user interface. A three dimensional size of the object is determined 103. From this size determination, a package is automatically selected 104 for the object. Also received 102 via the interface is information about material properties of the object. From this material properties information that may be received 102, an automatic determination 105 of the type of packing material may be made. The automatic selection 104 of the package and the automatic determination 105 of the packing material type lead to an automatic determination 106 of the packing material amount for the selected package.

Optionally, a user is provided on an electronic user interface with a design or a plurality of designs which are displayed 201 for user approval. The user, via the interface, accepts a design from those offered. The user acceptance may be received 202 via the interface and is then combined with the package when it is prepared 107 in order so that a package having the user-selected design may be provided 206. The use may input shipping information, object descriptions, instructions, or any other graphic or textual content which may then be printed on the package that is prepared 206. The first received image of the object may also be printed on the package 206.

Figure 4:
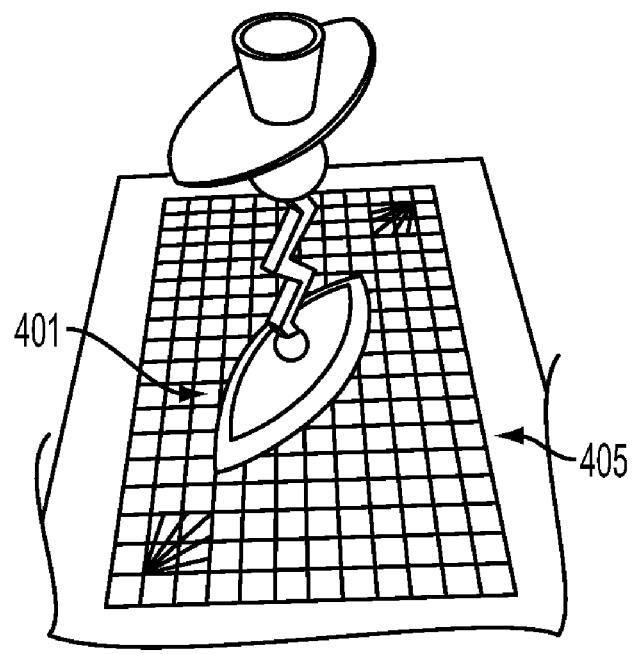
FIG. 4 depicts an example of a second received image of an object to be packaged wherein the first image and the second image show the object from different perspective views and the second background has a plurality reference points that provide a known dimension.

In another embodiment, a second image of the object may be received 101 via the electronic user interface. As shown in FIG. 4, this second image 401 may be taken from a different perspective view from the first image. This second image also has a background 405 with a plurality of reference points that provide a known dimension. The first image and second images are then compared in order to determine 103 the three-dimensional size of the object.

According to another embodiment, a user design modification may be received 203 and made from those offered when the designs are displayed 201 to the user on the interface. The package selection may then be modified 204 based on this design modification and the receipt 203 of the modification. The process of FIG. 1 continues to be followed to result in providing a determination 106 of the size and amount of packing material. The package selection as modified 204 and the provided size and amount of packing material as determined 106 combine to result in modifying 205 the automatic determination of packing material. Next, a package having the user-selected design may be provided 206.

It will be appreciated that various of the above-disclosed and other features and functions, or alternatives thereof, may be desirably combined into many other different systems or applications. It will also be appreciated that various presently unforeseen or unanticipated alternatives, modifications, variations or improvements therein may be subsequently made by those skilled in the art which are also intended to be encompassed by the disclosed embodiments.

What is claimed is:

1. A method of producing a package, comprising:
   receiving, via an electronic user interface coupled to a processor, a first image of an object to be packaged, the first image including a background having a lined grid providing a set of known dimensions;
   receiving, via the user interface, information relating to one or more properties of the object;
   determining a three dimensional size for the object by processing the first image;
   automatically selecting, by the processor, at least one package for the object;
   automatically determining, by the processor, based on the one or more properties of the object, a packing material type; and
   automatically determining, by the processor, based on the size and the selected package, a packing material amount.

2. The method of claim 1, further comprising:
   receiving shipping information via the user interface; and
   printing the shipping information on the selected package.

3. The method of claim 1, wherein:
   the determining a three dimensional size comprises comparing, by image processing, the object to the lined grid of the background.

4. The method of claim 1, further comprising printing the first image on the selected package.

5. The method of claim 1, wherein
   the one or more properties of the object comprise an indication of whether or not the object is fragile; and
   the automatically determining the packing material type is also based on the one or more properties.

6. The method of claim 1, wherein the automatically selecting a package comprises:
   accessing an available inventory of package sizes;
   comparing the determined three dimensional size of the object to the available inventory; and
   selecting, from the inventory, a package having a size closest to yet larger than that of the size of the object.

7. The method of claim 1, wherein the lined grid of the background comprises known coordinates.

8. The method of claim 7, wherein the coordinates comprise dimensions on a ruler.

9. The method of claim 1, further comprising receiving a second image of the object via the user interface, wherein the first image and the second image show the object from different perspective views; and wherein:
   the first image comprises a first background that provides a known dimension,
   the second image comprises a second background that provides a known dimension, and
   the determining a three dimensional size comprises comparing, by image processing, the object to the first background and the second background.

10. The method of claim 1, further comprising:
    displaying a design of the selected package for user approval;
    receiving a user acceptance of the design;
    providing the packing material of the determined type and amount to the user; and
    providing the selected package to the user.

11. The method of claim 1, further comprising:
    displaying a design of the selected package for user approval;
    receiving, via the user interface, a user modification to the design;
    selecting a modified package based on the user modification;
    automatically determining, based on a size of the modified package, whether to modify the determined packing material type and amount; and
    providing the modified package to the user.

12. The method of claim 5, wherein:
    the one or more properties comprise a weight of the object; and
    the automatically selecting a package is based on the weight and the determined size of the object.

13. The method of claim 1, further comprising:
    displaying a plurality of candidate package designs for user approval;
    receiving a user-selected design from the candidate package designs;
    providing a package having the user-selected design; and
    providing the packing material having the determined size and amount.

14. A method of selecting packaging, the method comprising:
    receiving, via an electronic user interface coupled to a processor, a first image of an object to be packaged, the first image including a background having a lined grid providing a set of known dimensions;
    receiving, via the user interface, information relating to one or more properties of the object;
    determining a three dimensional size for the object by processing the first image;
    automatically selecting, by the processor, at least one package for the object having a user-selected design;
    printing, via a printer, the first image on the selected package;

automatically determining, by the processor, based on the one or more properties, a packing material type;

automatically determining, by the processor, based on the size and the selected package, a packing material amount;

providing the selected package; and providing packing material having the determined packing material amount.

15. The method of claim 14, wherein:

the determining a three dimensional size comprises comparing, by image processing, the object to the lined grid of the background.

16. The method of claim 14, wherein the automatically selecting a package comprises:

accessing an available inventory of package sizes;

comparing the determined three dimensional size of the object to the available inventory; and selecting, from the inventory, a package having a size closest to yet larger than that of the size of the object.

17. The method of claim 14, wherein the lined grid of the background comprises known coordinates.

18. The method of claim 14, further comprising:

displaying, on the user interface, at least one candidate package design for user approval on an electronic user interface; and receiving, via the user interface, a user-selected design from the candidate package designs.

19. The method of claim 14, further comprising receiving a second image of the object via the user interface, wherein the first image and the second image show the object from different perspective views; and wherein:

the first image comprises a first background that provides a known dimension, the second image comprises a second background that provides a known dimension, and the determining a three dimensional size comprises comparing, by image processing, the object to the first background and the second background.

20. The method of claim 14, further comprising:

displaying a design of the selected package for user approval;

receiving, via the user interface, a user modification to the design;

selecting a modified package based on the user modification; and automatically determining, based on a size of the modified package, whether to modify the determined packing material type and amount;

wherein providing the selected package and packing material comprise providing the modified package and modified material amount to a user.

* * * * *